Patented Nov. 26, 1935

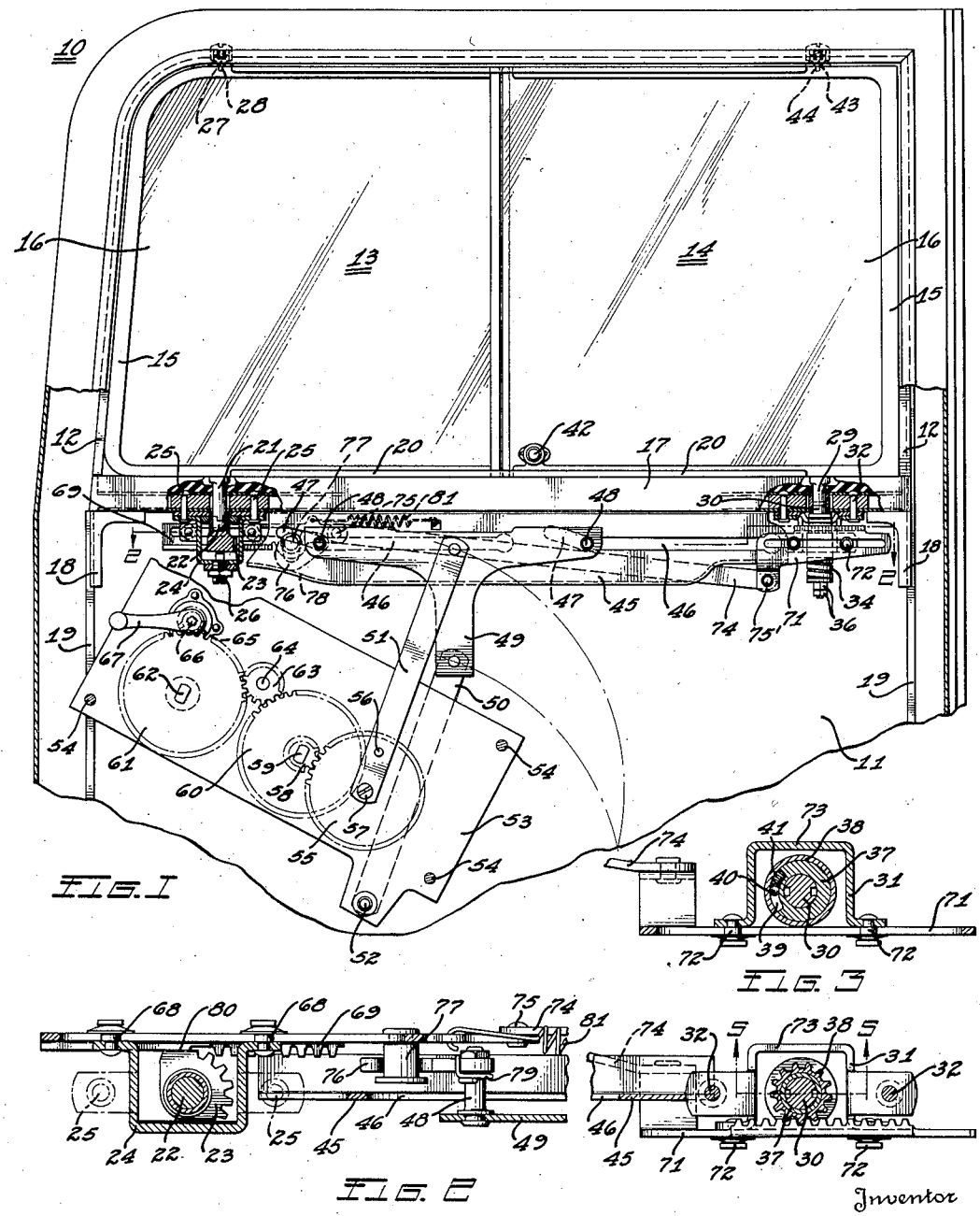

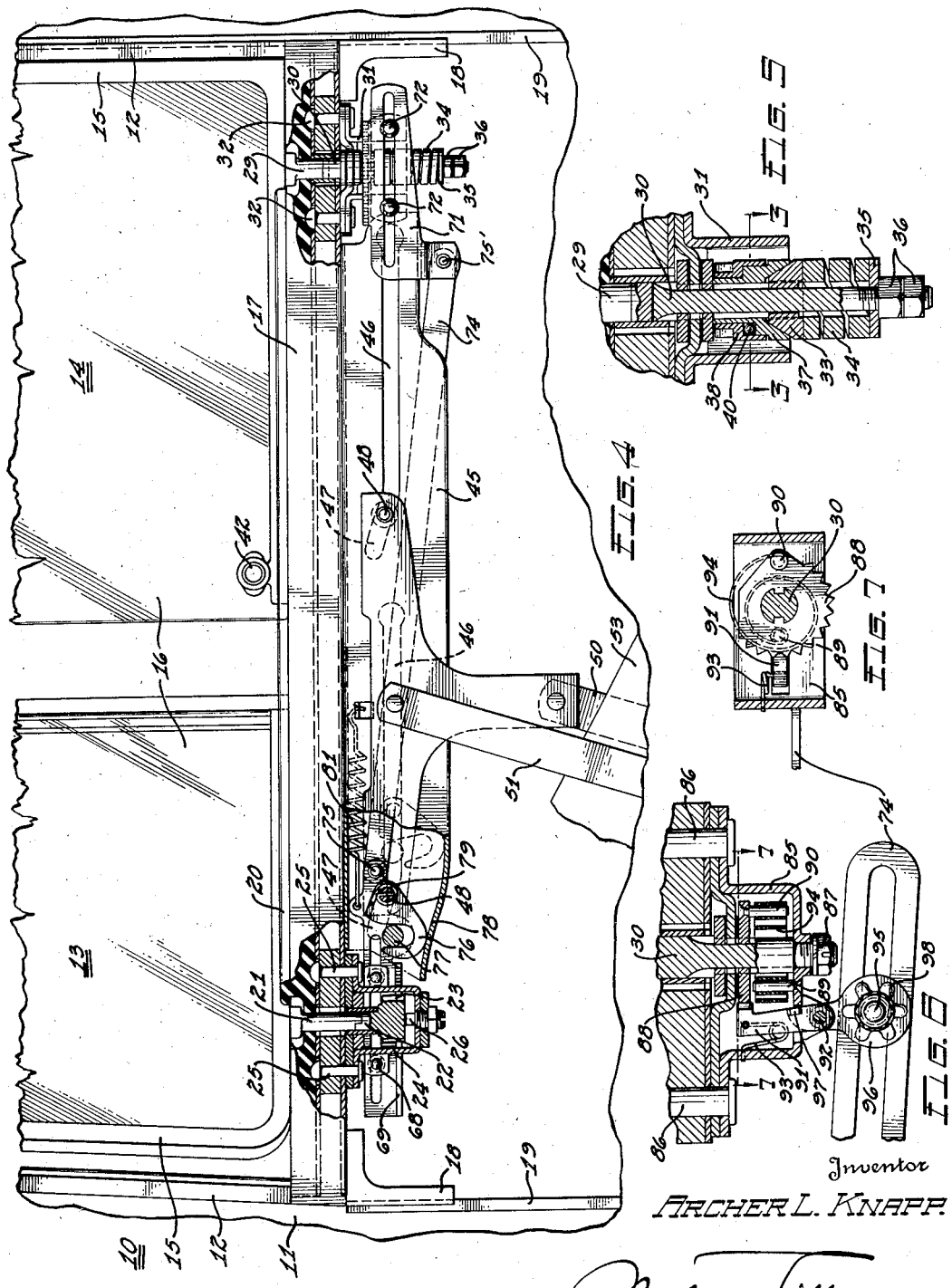

2,022,423

UNITED STATES PATENT OFFICE 2,022,423

MOTOR VEHICLE

Archer L. Knapp, Detroit, Mich., assignor to Packard Motor Car Company, Detroit, Mich., a corporation of Michigan Application May 1, 1933, Serial No. 668,794

16 Claims. (Cl. 296—44)

My invention relates to the construction of closed bodies for vehicles, and more particularly to the construction and operation of the window structure thereof.

An object of the invention is to provide a window construction for a closed vehicle body which can be readily adjusted in a plurality of directions to ventilate the interior of the body without causing drafts.

Another object of the invention is to provide a window construction in which window sections can be raised and lowered together and independently pivoted about vertical axes.

A further object of my invention is to provide a window construction for motor vehicle bodies wherein window sections can be raised and lowered together by manually operable mechanism and one of the windows moved about a vertical axis by the same mechanism and the other window section moved about a vertical axis through the application of force directly thereto.

Still another object of the invention is to provide a window construction for closed automobile bodies in which two longitudinally arranged window sections can be raised and lowered through manually operable mechanism which is utilized to move one of the window sections about a vertical axis and to make effective mechanism for automatically closing the other window section after it has been opened by swinging it about a vertical axis.

Another object of the invention is to provide a novel form of manually operable mechanism for moving a pair of window sections vertically and about vertical axes.

Other objects of the invention will appear from the following description taken in connection with the drawings, which form a part of this specification, and in which:

Fig. 1 is a side elevational view of a portion of a motor vehicle body door, partly broken away and partly in section, showing a window construction and operating mechanism therefor incorporating the invention;

Fig. 2 is a sectional view taken on line 2—2 of Fig. 1;

Fig. 3 is a sectional view taken on line 3—3 of Fig. 5;

Fig. 4 is an enlarged elevational view of a fragment of the window and operating mechanism therefor shown in Fig. 1;

Fig. 5 is a sectional view taken on line 5—5 of Fig. 2;

Fig. 6 is a sectional view of a modified form of mechanism for automatically closing the rear window section controlled by the raising and lowering mechanism;

Fig. 7 is a sectional view of the same taken on line 7—7 of Fig. 6.

Referring now to the drawings by characters of reference, 10 indicates generally the front door forming a part of one side of a closed motor vehicle body. There is the usual door frame having a panel 11 provided with a window opening bounded by a sash 12 within which is arranged the window structure consisting, in this instance, of a front section 13 and a rear section 14. Each of the window sections includes a frame 15 carrying a window glass 16.

The window sections are arranged to extend one behind the other longitudinally of the body and are mounted on a raising and lowering bar or support 17 provided at its ends with runners 18 which engage guide flanges 19 fixed on the door. Each window section is mounted so that it can be swung about a vertical axis and the supporting bar 17 is provided with flanges 20 to limit the swinging movement of the window sections in one direction. When the window sections bear against the flanges 20, they will extend in alignment longitudinally of the body and will close the window opening formed by the sash.

The front window section has fixed thereto a pintle 21 which extends through an opening in the supporting bar and keyed to the pintle is an extension 22 having a segment of a gear 23 formed thereon. A housing 24 is fixed to the under side of the supporting bar by bolts 25 and a bearing stop member 26 extends through the under side of this housing and engages the lower end of the pintle extension. Another pivotal connection is arranged axially above the pintle 21 and consists of a spring pressed plunger 27 carried by the sash which engages the recess 28 in the upper wall of the frame of the window section.

A pintle 29 extends from the bottom member of the rear window section and extends into an opening through the supporting bar 17. This pintle engages a driving extension 30 which extends below the supporting bar and through a housing 31 which is secured to the under side of the supporting bar by bolts 32. Keyed onto the extension 30 is one element 33 of a cone clutch which is engaged by a coil spring 34 retained on the extension by a washer 35 and nuts 36. The other element 37 of the cone clutch also surrounds the extension and is telescoped by a gear member 38. At one side of the clutch element 37 is formed a tapering groove 39 in which a ball 40 is arranged and normally pressed into clutched relation by a coil spring 41, thus providing a one-way clutch between the gear element 38 and the friction cone clutch. Through means of the cone clutch, the rear window section can be moved about its vertical axis when direct pressure is applied thereto and, in order to facilitate such movement, I provide a knob 42 on the frame of the rear window section. The spring 34 serves the function of normally maintaining the rear window section in any position of its angular adjustment. The rear window section also has another pivotal connection consisting of a spring pressed plunger 43 carried by the window sash which engages in a recess 44 formed in the top of the window section. This pivotal connection is in vertical alignment with the pintle 29. The purpose of the gear element 38 and the one-way clutch connection between such element and the cone clutch will be hereinafter described.

Associated with the bar 17 is manually operable mechanism for raising and lowering the window sections. To the under side of the bar is fixed an extension housing 45 having a pair of longitudinally extending slots 46 in one wall thereof terminating in angularly disposed end portions 47. In each of these slots a pin 48 is arranged to ride and fixed to the pins 48 is a T-shaped control member 49. A pair of parallel arms 50 and 51 are pivotally connected at one end to the control member, the arm 50 being pivotally mounted on a pin 52 carried by a supporting plate 53 fixed to the door panel by pins 54 while the other arm 51 is eccentrically fixed to a gear 55 by a pin 56. The lower end of the arm 51 and the gear 55 are mounted on a shaft 57 which is carried by the plate 53. Meshing with the gear 55 is another gear 58 which is fixed to a shaft 59 on which another gear 60 is mounted. A gear 61, mounted on a shaft 62, is connected in driving relation with the gear 60 by means of the gear 63 mounted on the shaft 64, and an actuator means 65 is fixed to the shaft 66 and engages with the gear 61, the shaft 66 having a crank 67 fixed to the inner end thereof within easy grasp of an occupant of the motor vehicle body. The shafts 57, 59, 64, 62 and 66 are all carried by the plate 53.

Turning of the crank 67 will operate the gear train so that rotation of the gear 55 will carry the arm 51 therewith and move the T-member 49 so that the pins 48 secured thereto will ride in the longitudinal portions of the slots 46 and have a cam action effect with the extension housing 45, thus raising or lowering the bar carrying the two window sections. When the T-member moves the pins 48 into the angular end portion 47 of the slots, there will be no resulting vertical movement of the bar or its extension as there will be no cam action, however, the T-member can move longitudinally of the door. When the pins 48 are in the position shown in Fig. 1, then the window sections will be in a closed position and can then be moved on their pivots about a vertical axis.

As previously explained, the rear window section can be swung about a vertical axis by the application of direct pressure thereto when the raising and lowering bar is in its uppermost position. The front window section is moved about its vertical axis through mechanism operated by the raising and lowering mechanism. Fixed to the housing 24 by means of bolts 68 is a rack 69 to one end of which a link 74 is pivoted at 75, the link connecting with another rack 71 by a pivot 75'. The rack 71 is carried by bolts 72 fastened to the housing 73 fixed to the under side of the raising and lowering bar 17 and surrounding the pintle 29 and its extension. Both racks 69 and 71 are formed with longitudinally extending slots through which the bolts 68 and 72 extend. On the pin 48 is pivotally mounted a connecting means in the form of a latch 76 which is adapted to engage and reciprocate a pin 77 fixed to the rack 69.

The connecting latch member is in operating relation with the rack 69 only while the pins 48 are riding in the angular ends of the slots 46, that is, a connection is made to operate the rack only when the raising and lowering mechanism is maintaining the supporting bar 17 in its uppermost position. The rack 69 meshes with the gear segment 23 while the rack 71 meshes with the gear element 38.

In order to control the position of the latch member so that it will be effective and ineffective at the proper time, I form the lower wall of the extension 45 in the form of a run-way which takes the form of a cam, as indicated at 78, so that as the T-member carrying the front pin 48 moves forwardly in the angular portion of its slot 46, the latch member 76 will be moved upwardly to engage the pin 77 and to move it therewith. The movement of the pins 48 in the angular extensions of the slots 46 will move the rack 69 with the control member through the latch connection. This latch member is normally held in a downward position by a spring 79 surrounding and fixed to the pin 48 so that, when the run-way 78 permits, the spring will force the latch member away from connecting relation with the pin 77 and this takes place at the junction of the angular portion of the groove portion 46 and the main horizontal portion thereof. Thus by a turning of the crank 67, after the supporting bar is in its uppermost position, the front window section 13 will be rotated about its vertical axis.

The rack 69 will move with the rack 71 through the connecting link 74 upon operation of the raising and lowering mechanism to pivot the front window section but, while it will rotate the gear element 38, the one-way clutch 40 will not cause a driving relation between the gear element 38 and the friction clutch to drive the pintle extension 30 and opening movement of the rear window section must be had by direct application of force to the window section itself. It has been observed that operation of the crank in one direction will cause the front window to pivot in a closing direction so that it will close prior to lowering operation of the supporting bar. This same operation of the raising and lowering mechanism and movement of the bars 69 and 71 will cause rotation of the gear element 38 and, during closing operation of the front window section, there will be a driving relation from the gear 38 to the friction clutch through the one-way clutch 40 and thus operation of the rack 71 will positively close the rear window section. It will thus be seen that the raising and lowering mechanism serves as an actuator to swing the front window section into either an opening or closing direction and that it will also serve to move the rear window section into a closed relation. This same mechanism is of such a nature that it will close both the front and rear window sections prior to movement of the bar 17 to lower the window structure from its uppermost position.

The rear edge of the front window section is arranged to overlap the forward edge of the rear window section, when closed, and hence the rear window section cannot be moved about its vertical axis into an open position unless the forward window section has first been moved into an open position about its vertical axis. The gear segment 23 is formed with a flat portion 80 at one end of the teeth which will bear against the flat portion of the rack 69 at the forward end of the teeth thereon. In Fig. 2, I have shown the position of the rack 69 when it has been moved as far as it will travel prior to the disconnection of the latch member 76 with the pin 77, that is, this position is present when the latch drops away from the pin 77 with the pin 46 at the angular junction of the slots 46. As the latch releases, the rack 69 will be moved further to the right by means of coil spring 81 fixed thereto and to the bar extension, thus sliding the rack so that the flat portion thereof contacts with the portion 80 of the gear segment and with an edge of the front tooth of the gear segment 23. When in such position, the contact of the gear tooth and the flat portion 80 with the flat portion of the rack will provide a two point contact which will serve as a locking means to prevent rotation of the pintle extension 22 and consequently prevent rotation of the front window section 13 except through operation of the crank 67. In this manner, unauthorized opening of the front window sections about their vertical axes from the exterior of the vehicle body is prohibited.

In Figs. 6 and 7, I have shown mechanism associated with the pintle 29 which will automatically swing the rear window closed, such mechanism being under the control of the raising and lowering mechanism for the window structure. In this instance, such mechanism takes the place of the previously described gear element 38, the cone clutch, the one-way clutch between the gear element, and the spring for maintaining the friction clutch in engagement.

The lower end of the pintle extension 30 extends through a housing 85 secured to the bottom of the raising and lowering bar by bolts 86 and is secured against axial displacement by a nut 87. A ratchet gear 88 is keyed to the pintle extension and a coil spring 94 is connected at one end to a pin 89 fixed to the cover of the casing 85 and at the other end to a pin 90 fixed to the ratchet gear. This spring normally tends to move the pintle extension in a direction swinging it on its vertical axis into closed position and thus, when the ratchet gear is free to operate, the spring will automatically close the rear window section. Associated with the ratchet gear is a pawl 91 pivoted to an extension of the casing 85 by a pin 92 and a spring 93 is connected with the pawl and the casing to normally hold the pawl in engagement with the ratchet gear. It will thus be seen that, with this construction, the rear window section is free to be opened or closed by the application of direct pressure thereto as such pressure can overcome the pressure of the spring 93, also, when direct pressure is not applied, this ratchet will normally hold the rear window section in any position of its vertical adjustment.

In this instance, there is no necessity for the rack 71 and the arm 74 is slotted at its end to receive a pin 95. Associated with this pin is a resilient washer 98 which frictionally holds an arm 96 against the link 74 in a relation such that a flanged end 97 of the arm will control the angular position of the pawl. As the link 74 is moved toward the front of the vehicle, it will slide relative to the arm allowing the spring 93 to force the pawl to engage the ratchet gear and, when the bar is moved rearwardly, it will move the arm 96 therewith, causing the flange 97 to carry the pawl away from the ratchet gear allowing the spring 94 to automatically rotate the rear window structure to closed position prior to lowering of the window.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a window structure, the combination of a pair of windows, a bar on which said windows are rotatably mounted, means for raising and lowering said bar, and mechanism operated by said raising and lowering means for rotating one of said windows in opposite directions and for rotating the other window in only one direction.

2. In a window structure, the combination of a pair of windows, a vertically slidable bar on which said windows are mounted, manually operable mechanism for raising and lowering said bar, means operated by said mechanism for rotating said windows, a positive driving connection between said means and one window, and a one-way driving connection between said means and the other window.

3. In a window structure, the combination of a pair of windows, a vertically slidable bar on which the windows are mounted, manually operable mechanism for raising and lowering said bar, means operated by said mechanism for rotating the windows, a positive driving connection between said means and one of the windows, and driving means between said means and the other window including a friction clutch and a one-way clutch between said means and the friction clutch.

4. In a window structure, a window, a bar on which said window is pivotally mounted, mechanism for raising and lowering said bar, means driven by the mechanism while the bar is in uppermost position, and a rotatable driving connection between said means and the window comprising a one-way clutch operable by said means and a friction clutch between the window and the one-way clutch.

5. In a window structure, a bar, a window having a pintle carried by said bar, mechanism for raising and lowering said bar, a spring engaging said pintle and normally urging it in a direction to close the window, pawl and ratchet means associated with the pintle, and a control means for the pawl connected to be operated by said mechanism, said control means being released upon operation of said mechanism in a direction to lower the bar and prior to lowering of the bar.

6. In a window structure, a bar, a pair of windows carried by the bar, manually operable mechanism for raising and lowering the bar, rack means, pivot means fixed to the windows, connections between the racks and the pivot means, one of said connections including a friction clutch, and a connection between said mechanism and said rack means, said rack means being actuated by said mechanism to rotate said pivot means while the bar is in its uppermost position.

7. In a window structure, a bar, a pair of windows carried by the bar, manually operable mechanism for raising and lowering the bar, rack means, pivot means fixed to the window, connections between the racks and the pivot means, one of said connections including a friction clutch, and a releasable connection between said mechanism and said rack means, said rack means being actuated by said mechanism to rotate said pivot means while the bar is in its uppermost position.

8. In a window structure, a bar, a window carried by the bar, manually operable mechanism connected to raise and lower the bar, a pintle fixed to the window, a friction clutch having an element fixed to the pintle, spring means engaging the friction clutch, a gear element, a one-way clutch means between the gear element and the friction clutch, a rack engageable with the gear element, and a connection between the mechanism and the rack, said rack being actuated by operation of the mechanism while the bar is in its uppermost position.

9. In a window structure, a bar, a window carried by the bar, manually operable mechanism connected to raise and lower the bar, a pintle fixed to the window, a gear segment on the pintle, a rack slidable to engage and rotate the gear segment, a latch member anchored to the mechanism, a pin on the rack, and cam means controlling said latch in its movement with the mechanism to engage and disengage the pin, said latch being engageable with the pin only while the bar is in its uppermost position and being released when the bar is being raised or lowered.

10. In a window structure, a bar, a window carried by the bar, manually operable mechanism connected to raise and lower the bar, a pintle fixed to the window allowing rotation thereof about a vertical axis, a gear segment on the pintle, a rack slidably engageable with the gear segment, a latch member anchored to the raising and lowering mechanism and adapted to be reciprocated thereby, a pin on the rack, and means regulating the engagement of the latch with the pin to cause rotation of the rack only when said mechanism is operated with the bar in its uppermost position.

11. In a window structure, a bar, a window carried by the bar, manually operable mechanism to raise and lower the bar, a pintle fixed to the window, a gear segment on the pintle having a flat side adjacent one end of the teeth, said gear segment being fixed to the pintle, a slidable rack having a tooth portion engageable with the gear segment to rotate the same, a latch member anchored to the mechanism, a pin on the rack, means controlling engagement of the latch with the pin, and a spring for moving the gear segment to engage the flat face thereof with a flat portion of the rack after the tooth portion of the rack has become disengaged from the teeth of the gear segment.

12. A window structure comprising a bar, a window carried by said bar, manually operable mechanism connected to raise and lower the bar, means operable by said mechanism to rotate said window relative to said bar, means operable to lock said window on said bar, and a connector means between said locking means and said mechanism, said connector means being operable by said mechanism to control said locking means.

13. In a window structure, a bar, a window carried by the bar, an extension on the bar having a pair of longitudinally extending slots therein terminating in an angular portion at one end, pins slidable in the slots, manually operable mechanism connected to the pins for moving them in the slots, a pintle fixed to the window, a gear segment on the pintle, a rack engageable with the gear segment, a pin on the rack, a latch member carried by one of the pins connected with the manually operable mechanism, and cam means on the extension for controlling the engagement and disengagement of the latch member with the pin on the rack, said cam cooperating with said latch member to cause engagement with the pin on the rack only when the pins are in the angular portion of the slots.

14. In a window structure, a bar, a pair of windows carried by the bar, pintle means fixed to the windows for rotating them about a vertical axis relative to the bar, a pair of racks, a link connection between the racks, raising and lowering mechanism for the bar connected to reciprocate the racks when the bar is in its uppermost position, a positive driving connection between one of the pintles and the rack, and a one-way positive connection between the other pintle and the other rack.

15. In a window structure, a bar, a window mounted on the bar, a pintle extending through the bar, a gear segment on the pintle, a rack engageable with the gear segment, an extension on the bar having a pair of longitudinal slots therein terminating in an angular end, pins movable in the slots, a control member fixed to the pins, manually operable mechanism for reciprocating the control member to raise and lower the bar, the movement of the pins in the angular end of the slots allowing reciprocation of the control member without effecting raising and lowering of the bar, and a releasable connection between the rack and one of the pins, said releasable connection being in engagement with the rack only while the control member is moving in the angular end portions of the slots.

16. In a window structure, the combination of a pair of pivotally and slidably mounted windows, mechanism for raising and lowering said windows, and means operated by said mechanism for positively rotating one of said windows in opposite directions and for positively rotating the other window in one direction only.

ARCHER L. KNAPP.